United States Patent
Lewis (10) Patent No.: US 8,978,325 B2
(45) Date of Patent: Mar. 17, 2015

(54) INSULATING WALL PANEL WITH ELECTRICAL WIRE CHASE SYSTEM

(76) Inventor: David L. Lewis, Bethlehem, CT (US)

( * ) Notice: Subject to any disclaimer, the term of this patent is extended or adjusted under 35 U.S.C. 154(b) by 139 days.

(21) Appl. No.: 13/307,596

(22) Filed: Nov. 30, 2011

(65) Prior Publication Data

US 2013/0133277 A1 May 30, 2013

(51) Int. Cl.
- *E04C 2/52* (2006.01)
- *E04B 1/76* (2006.01)
- *E04B 1/80* (2006.01)
- *E04C 2/20* (2006.01)
- *E04B 1/00* (2006.01)
- *E04B 1/38* (2006.01)

(52) U.S. Cl.
CPC .............. *E04B 1/7675* (2013.01); *E04B 1/0007* (2013.01); *E04B 1/80* (2013.01); *E04C 2/205* (2013.01); *E04C 2/521* (2013.01); *E04B 2001/386* (2013.01)
USPC ...... 52/220.2; 52/220.3; 52/309.7; 52/309.16; 52/586.2

(58) Field of Classification Search
USPC ............ 52/220.1, 220.2, 220.3, 220.4, 220.5, 52/220.7, 220.8, 309.7, 309.16, 586.1, 52/586.2, 588.1
See application file for complete search history.

(56) References Cited

U.S. PATENT DOCUMENTS

| | | | | |
|---|---|---|---|---|
| 3,391,507 A * | 7/1968 | Downing | ...................... | 52/314 |
| 3,562,985 A * | 2/1971 | Nicosia | ...................... | 52/241 |
| 3,924,056 A * | 12/1975 | LoCicero | ...................... | 174/497 |
| 4,953,334 A * | 9/1990 | Dickens | ...................... | 52/309.4 |
| 5,465,541 A * | 11/1995 | Lin et al. | ...................... | 52/220.2 |
| 5,519,971 A * | 5/1996 | Ramirez | ...................... | 52/220.2 |
| 5,600,930 A * | 2/1997 | Drucker | ...................... | 52/585.1 |
| 5,673,524 A * | 10/1997 | Gailey | ...................... | 52/309.9 |
| 5,771,645 A * | 6/1998 | Porter | ...................... | 52/220.2 |
| 5,799,462 A * | 9/1998 | McKinney | ...................... | 52/742.13 |
| 5,842,276 A | 12/1998 | Asher et al. | | |
| 5,893,248 A * | 4/1999 | Beliveau | ...................... | 52/309.7 |
| 6,026,628 A | 2/2000 | Lopez | | |
| 6,167,624 B1 * | 1/2001 | Lanahan et al. | ...................... | 29/897.32 |
| 6,209,284 B1 | 4/2001 | Porter | | |
| 6,318,041 B1 * | 11/2001 | Stanley | ...................... | 52/505 |
| 7,543,419 B2 * | 6/2009 | Rue | ...................... | 52/630 |
| 8,359,808 B2 * | 1/2013 | Stephens, Jr. | ...................... | 52/742.14 |

(Continued)

OTHER PUBLICATIONS

Canadian Office Action dated Nov. 18, 2013, application No. 2,797,479 applying Asher et al (d1) and Lopez (D2) with reasons (3 pages).
Canadian Office Action dated Aug. 26, 2014, application No. 2,797,479 applying Asher et al (D1) and Radoane (D2) with reasons (3 pages).

(Continued)

*Primary Examiner* — Michael Safavi
(74) *Attorney, Agent, or Firm* — Ware, Fressola, Maguire & Barber LLP (57) ABSTRACT

An insulating panel to be used in a panelized insulation system for insulating and finishing walls, including basement walls has a foam core made of inorganic materials. The system incorporates a capillary break, an integrated water drainage system and an electrical wire chase system within an insulating wall panel. Vertical slots are provided for insertion of metal studs for use in attaching the interior finish panel, such as inorganic fiber cement board with a vinyl laminate finish, onto the insulating panels. Embedding metal studs in the panel core reduces the sound transmission though the panel and eliminates thermal bridging between warm and cold surfaces. Steps on the edges and the top/bottom surfaces of the insulating panel allow more panels to join together with shiplap joints.

17 Claims, 8 Drawing Sheets

(56) References Cited

U.S. PATENT DOCUMENTS

| | | | |
|---|---|---|---|
| 8,555,585 B2 * | 10/2013 | Dickens | 52/309.9 |
| 2002/0069600 A1 * | 6/2002 | Bryant | 52/309.9 |
| 2010/0011699 A1 * | 1/2010 | Weimer et al. | 52/745.1 |
| 2011/0258944 A1 | 10/2011 | Radoane | |
| 2012/0317923 A1 * | 12/2012 | Herdt et al. | 52/783.11 |

OTHER PUBLICATIONS

Canadian Office Action dated Jan. 16, 2015, application No. 2,797,479 applying Asher et al (D1), Radoane (D2), and Porter (D3) with reasons (5 pages).

Claims pending in Canada including claims 1-4, 6 & 9 rejected in Canadian Office Action dated Jan. 16, 2015, application No. 2,797,479 (7 pages).

* cited by examiner

INSULATING WALL PANEL WITH ELECTRICAL WIRE CHASE SYSTEM

FIELD OF THE INVENTION

The present invention relates generally to an insulating panel and, particularly, to an insulating wall panel system for finishing basement walls.

BACKGROUND OF THE INVENTION

A typical way to insulate and finish basement walls is to build a wood or metal frame stud wall adjacent to the foundation wall and to insulate it with fibrous glass batting. Organic building materials such as the cellulose of the wood studs and paper layers of the gypsum products or batt insulation support the growths of molds, fungi, and mildew. In a damp and humid environment the organic components are especially susceptible to dry rot and decomposition.

Fibrous insulation batts are susceptible to significant insulation value losses with increases in the moisture content in the insulation, compromising the thermal integrity of the insulation system. The conventional wood or steel stud framing that is positioned adjacent to both the concrete wall and interior finish provides direct thermal bridging from the concrete walls to the interior surfaces of the finished space. The wood and steel framing significantly reduces the R-Value insulating components of the wall system, by as much as 50%-80%.

SUMMARY OF THE INVENTION

The present invention provides an insulating panel to be used in a panelized insulation system for insulating and finishing walls, including basement walls. The system incorporates a capillary break, an integrated water drainage system and an electrical wire chase system within an insulating wall panel. The insulating wall panel can be made of one or more inorganic materials, for example. Metal studs such as metal hat channels can be used to attach the interior finish panel, such as an inorganic fiber cement board with vinyl laminate finish, onto the insulating panels. Embedding metal studs in the panel core reduces the sound transmission through the panel as compared to conventional wood framing techniques. Steps on the edges and the top/bottom surfaces of the insulating panel allow adjacent panels to join together with shiplap joints. Shiplap joints resist water intrusion between the panel seams and joints.

Thus, according to the first aspect of the present invention, the present invention provides an insulating panel, comprising:
a first surface and an opposing second surface;
a first edge and an opposing second edge substantially parallel to a first direction;
a first side-surface and an opposing second side-surface substantially parallel to a second direction, the second direction substantially perpendicular to the first direction; and
a panel core surrounded by the first side-surface, the first edge, the second side-surface and the second edge, the panel core having a panel thickness defined by the first surface and the second surface.

In one embodiment of the present invention, the insulating panel further comprises
a first chase made through the panel core between the first surface and the second surface, from the first edge to the second edge, the chase dimensioned for electrical wire insertion, the chase substantially parallel to the second direction.

In another embodiment of the present invention, the insulating panel also comprises
a second chase made through the panel core between the first surface and the second surface, from the first side-surface to the second side-surface, the second chase dimensioned for different electrical wire insertion, the second chase substantially parallel to the first direction.

In a different aspect of the present invention, the insulating panel comprises:
a front surface and a back surface;
a first edge and an opposing second edge parallel to a first direction;
a top side-surface and a bottom side-surface parallel to a second direction, the second direction substantially perpendicular to the first direction;
a panel core surrounded the top side-surface, the first edge, the bottom side-surface and the second edge, the panel core having a panel thickness defined by the front surface and the back surface;
a first chase made through the panel core between the front surface and the back surface, from the first edge to the second edge, the chase dimensioned for electrical wire insertion, the chase substantially parallel to the second direction; and
a second chase made through the panel core between the front surface and the back surface, from the top side-surface to the bottom side-surface, the second chase dimensioned also for electrical wire insertion, the second chase substantially parallel to the first direction, wherein the first chase and the second chase are made through different parts of the panel core. The panel core can be made of one or more inorganic materials, for example.

In some insulating panels, a pocket is provided through the first surface for the installation of an electrical box for providing an outlet for the electrical wire inserted in the first chase.

In some embodiments of the present invention, the insulating panel further comprises:
a third chase made through the panel core between the first surface and the second surface, from the first edge to the second edge, the chase dimensioned for electrical wire insertion, the third chase substantially parallel to the second direction, the third chase spaced from the first chase;
a first pocket made through the first surface, the first pocket dimensioned for installation of an electrical box for electrically connecting one or more electrical wires in the first chase to one or more electrical wares in the second chase; and
a second pocket made through the first surface, the first pocket dimensioned for installation of another electrical box for electrically connecting one or more electrical wires in the third chase to said one or more electrical wires in the second chase.

In one embodiment of the present invention, the front surface of the insulating panel also has an indicator having to indicate a location of the first chase; and an indicator to indicate a location of the second chase.

According to one embodiment of the present invention, the insulating panel further comprises one or more slots made into the first surface through part of the panel thickness, from the top side-surface to the bottom side-surface, each of the slots substantially parallel to the first direction, wherein the slots are dimensioned for insertion of a hat channel, such as a metal hat channel.

In order to form a shiplap joint when two insulating panels to join side-by-side, steps are made along the edges. When two insulating panels are vertically stacked or joined to extend the height, steps are also provided along the side-surfaces of the insulating panels to form a shiplap joint.

According to one embodiment of the present invention, one or more drainage slots or channels are made into the back surface through part of the panel thickness, from the top side-surface to the bottom side-surface, parallel to the first direction.

According to one embodiment of the present invention, a drainage slot or channel made into the back surface and connected to the first chase, a different channel made into the second surface and connected to the second chase.

According to one embodiment of the present invention, metal studs are embedded in the panel core to reduce sound transmission and thermal bridging. A water-resistant laminate can be provided on the back surface.

The third aspect of the present invention is a wall insulation system, which comprises:
a first insulating panel; and
a second insulating panel, each of the first insulating panel and the second insulating panel comprising:
  a front surface and a back surface;
  a first edge and an opposing second edge substantially parallel to a first direction;
  a top side-surface and a bottom side-surface substantially parallel to a second direction, the second direction substantially perpendicular to the first direction;
  a panel core surrounded the top side-surface, the first edge, the bottom side-surface and the second edge, the panel core having a panel thickness defined by the front surface and the back surface; and
  a first chase made through the panel core between the front surface and the back surface, from the first edge to the second edge, the chase dimensioned for electrical wire insertion, the chase substantially parallel to the second direction,
  a second chase made through the panel core between the front surface and the back surface, from the top side-surface to the bottom side-surface, the second chase dimensioned for different electrical wire insertion, the second chase substantially parallel to the first direction.
The first insulating panel and the second insulating panel are configured to form a shiplap joint for joining one with another.

The present invention will become apparent upon reading the description taken in conjunction with FIGS. 1-9.

DETAILED DESCRIPTION OF THE INVENTION

Figure 1:
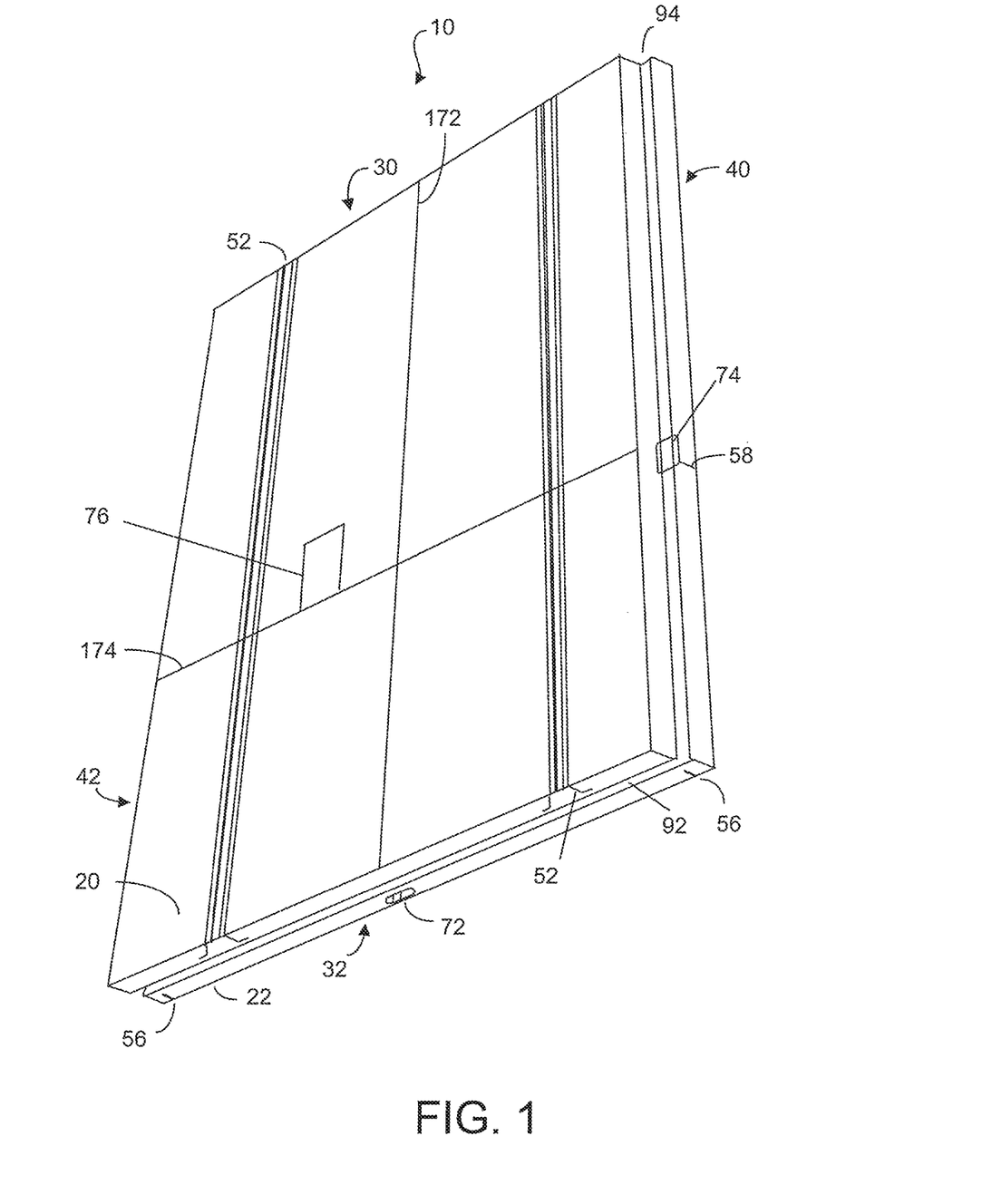
FIG. 1 is a perspective view of an insulating panel, according to one embodiment of the present invention.

The present invention provides a panelized insulation system for insulating and finishing walls, including basement walls. The panelized insulation system comprises insulating panels configured to form a vertical stack with two or more panels to extend the height and to join with each other side-by-side. FIG. 1 is a perspective view of an insulating panel, according to one embodiment of the present invention. As shown in FIG. 1, the insulating panel 10 has a front surface 20 and an opposing back surface 22 which is hidden from view. The panel 10 is surrounded by a top side-surface 30, first edge 40, a bottom side-surface 32, and a second edge 42. The panel 10 is substantially rectangular in shape such that the top side-surface 30 is substantially parallel to the bottom side-surface 32 and the first edge 40 is substantially parallel to the second edge 42 and perpendicular to the top side-surface 30. The panel 10 is configured to be placed against a wall with the back surface 22 facing the wall. In many, but not all, applications, the panel 10 is placed in a vertical position with the first and second edges 40, 42 parallel to the vertical direction. A bottom view of the panel 10 is shown in FIG. 2 and the side view of the panel 10 is shown in FIG. 3.

Figures 2, 8:
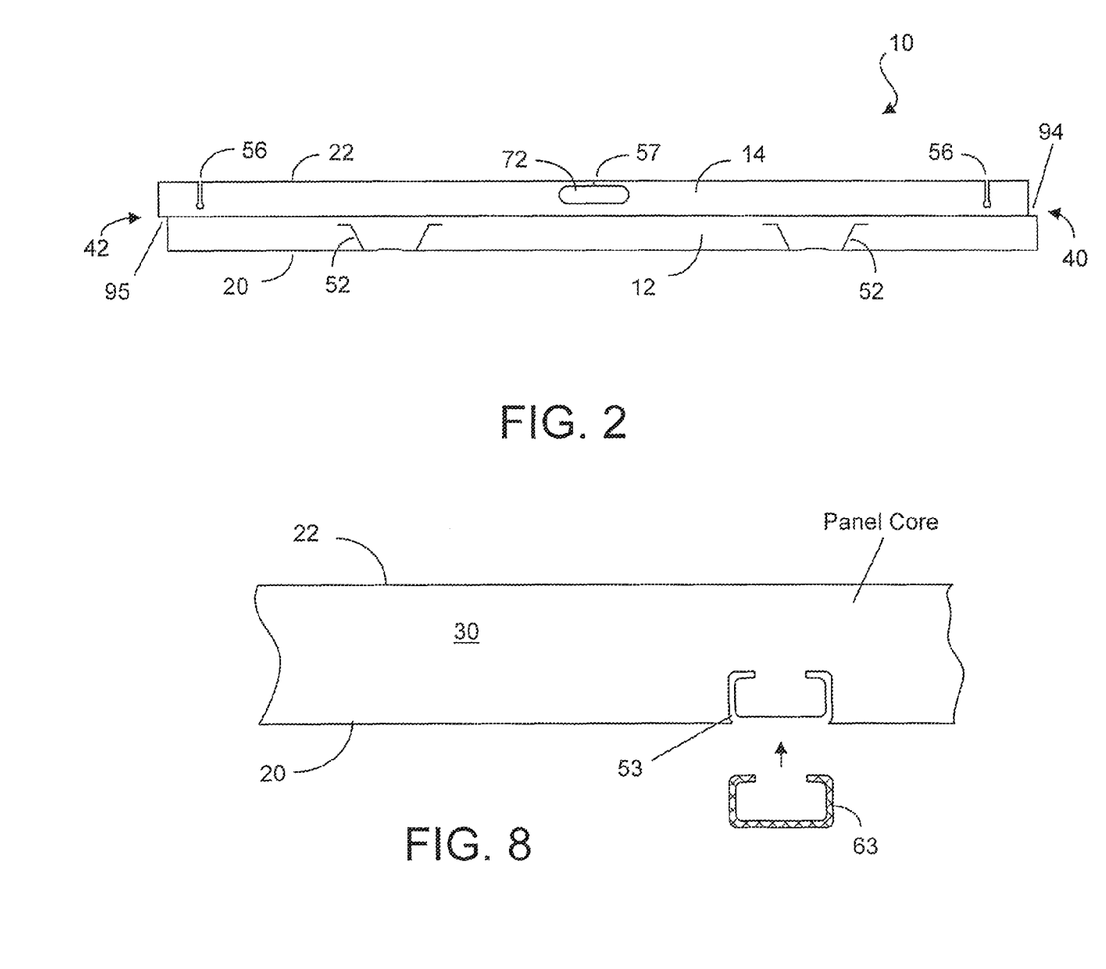
FIG. 2 is a bottom view of the insulating panel.
FIG. 8 shows a different vertical slot dimensioned for insertion of a C-shape stud.
Figure 3:
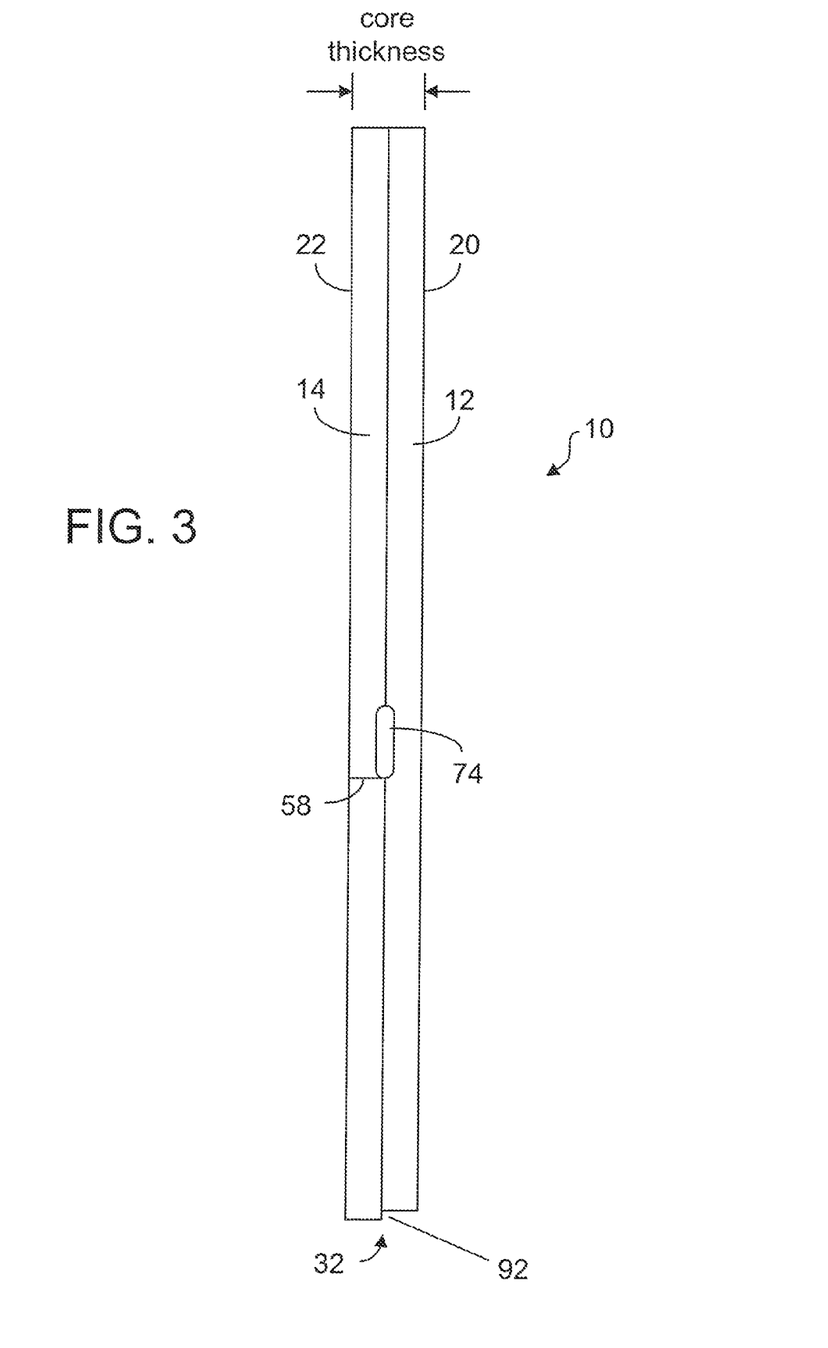
FIG. 3 is a side view of the insulating panel.

As indicated in FIGS. 1-3, the insulating panel 10 has a panel core having a panel thickness defined by the front surface 30 and the back surface 22. In one embodiment of the present invention, the insulating panel 10 has two vertical slots 52 made into the front surface 20 through part of the panel thickness, from the top side-surface 30 to the bottom side-surface 40, the slots 52 substantially parallel to the first edge 40. Each of the slots 52 is dimensioned for insertion of a support, such as a hat channel (see FIG. 5). As shown in FIGS. 2 and 3, the panel 10 has a first thickness portion 12 and a second thickness port 14. The panel 10 has a preformed vertical wire chase 72 made through the panel 10 between the front surface 20 and the back surface 22, from the top side-surface 30 and the bottom side-surface 32. The panel 10 also has a preformed horizontal wire chase 74 made through the panel 10 between the front surface 20 and the back surface 22, from the first edge 40 to the second edge 42. The wire chases 72, 74 are dimensioned for electrical wire/cable insertion. The vertical wire chase 72 and the horizontal wire chase 74 are offset within the panel core such that the two chases 72, 74 do not meet with each other. For example, the vertical wire chase 72 is made in the second thickness portion 14 whereas the horizontal wire chase 74 is made between the first thickness portion 12 and the second thickness portion 14. The wire chases are made at a depth from the front panel surface 20 so as to protect the wires in the chases from puncture by the finish surface fasteners. For example, the finish surface fasteners are screws made through the sheet rock into the hat channels. The wires in the wire chases are placed far back so as not to be punctured with recommended 1⅝" sheet rock screws, for example. To mark the locations of the vertical wire chase 72 and the horizontal wire chase 74, the front surface 20 has an indicator 172 having a length made substantially parallel to the vertical wire chase 72, and another indicator 174 having a length made substantially parallel to the horizontal wire chase 74. A field cut pocket 76 is provided on the front surface 20 adjacent to the vertical wire chase 72 and the horizontal wire chase 74 so that an electrical box can be installed to connect the electrical wires in the vertical wire chase 72 to an electrical receptacle outlet and to the electrical wires in the horizontal wire chase 74, for examples.

In one embodiment of the present invention, the panel 10 also has one or more vertical drainage slots or channels 56 to drain possible water collected on the panel 10. Furthermore, a drainage slot or channel 57 made into the back surface 22 through part of the panel thickness from the back surface 22 to the vertical wire chase 72. The panel 10 also has a drainage slot or channel 58 made into the back surface 22 through part of the panel thickness, from the back surface 22 to the horizontal wire chase 74. The drainage slot 58 intersects with vertical drainage channels (see FIG. 7) and can be used to channel away possible water collected in the horizontal wire chase 74 and the cut pocket 76. The drainage slot 57 can also be used to channel away possible water collected in the horizontal wire chase 74. As can be seen in FIG. 3, the drainage channel 58 is made at the lowest level in the horizontal wire chase 74 so that water will not acuminate or build up in the chase 74.

Figure 4:
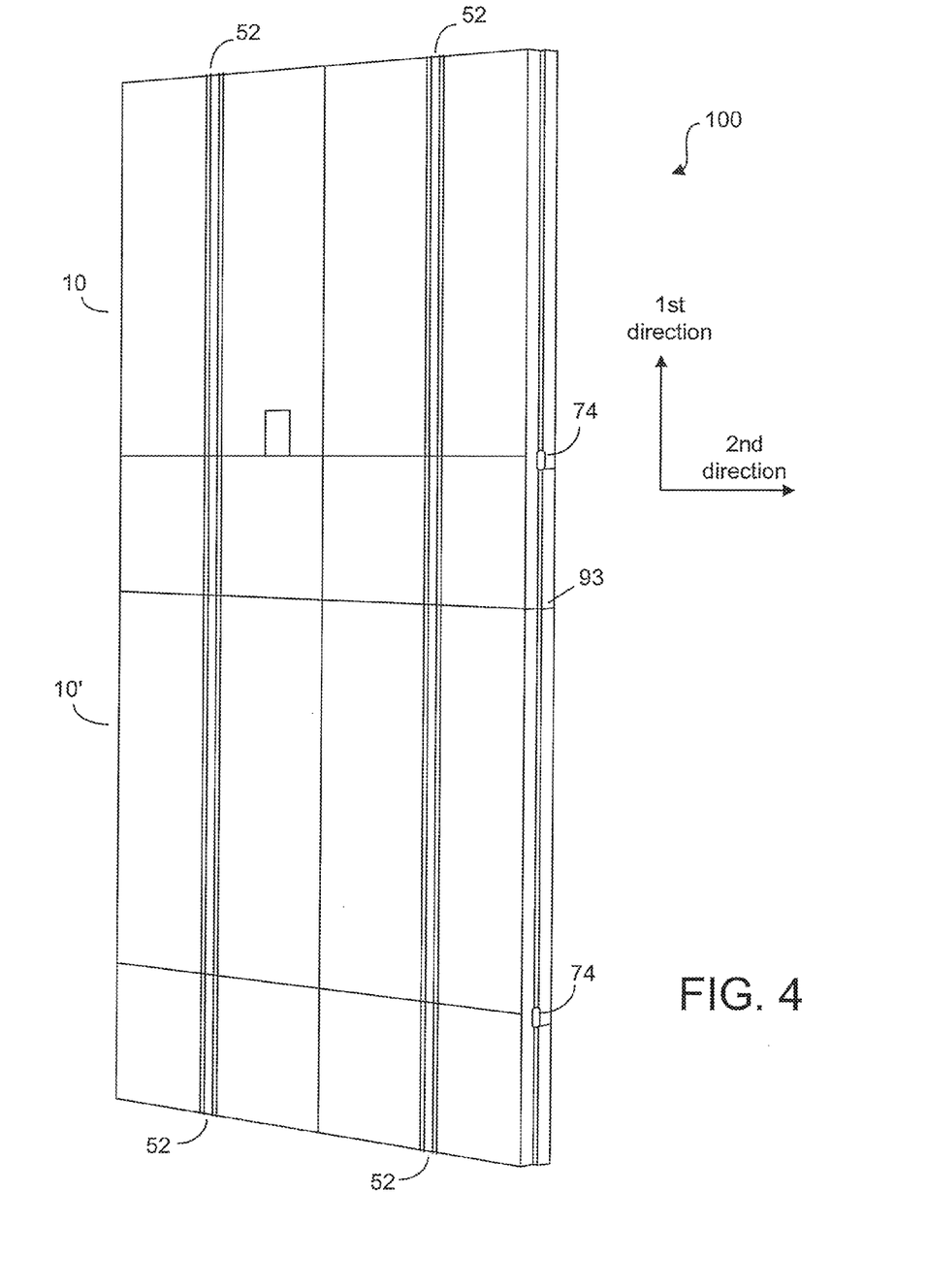
FIG. 4 shows two insulating panels in a vertically joined configuration.

As shown in FIG. 3, a step 92 is made between the first thickness portion 12 and the second thickness portion 14 so that the panel 10 can be stacked on top of another insulating panel 10' in a vertically joined configuration as shown in FIG. 4. As shown in FIG. 4, the insulating panel 10' also has complementary step to form a shiplap joint 93. As can be seen in FIG. 4, the shiplap joint 93 is made such that the higher side of the joint 93 is positioned at the first thickness portion 12, or toward the front surface 20. As such, water from the back surface 22 cannot pass through the shiplap joint 93 to the front surface 20 without climbing up the step 92 (see FIG. 3).

Figure 5:
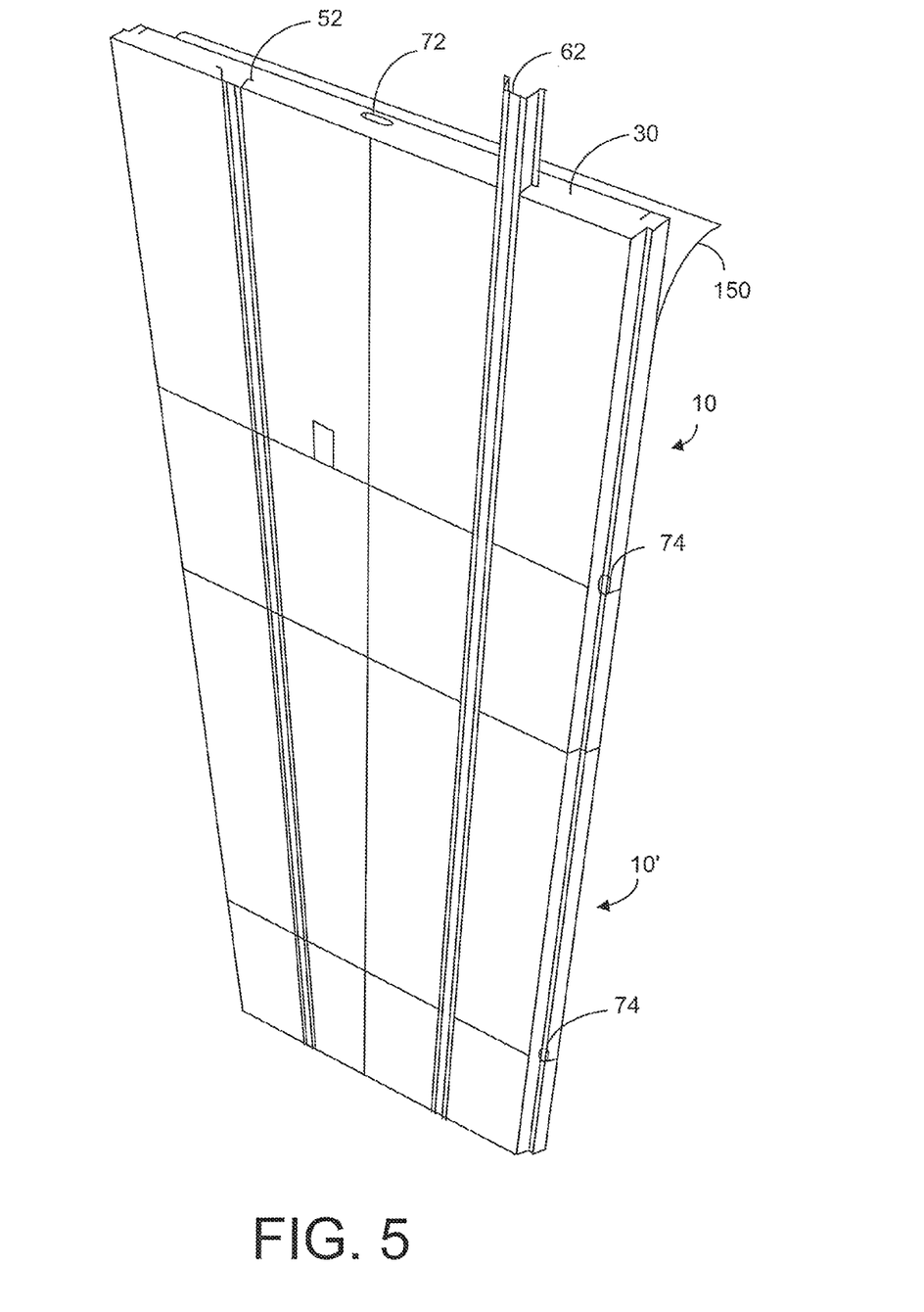
FIG. 5 shows the joined insulating panels and a metal hat channel.

FIG. 5 shows the vertically joined insulating panels and a hat channel. As shown in FIG. 5, each of the slots 52 is dimensioned to fit a hat channel 62. When the insulating panels 10, 10' are stacked to extend the height, the hat channels 62 are inserted in the slots 52 in both insulating panels 10, 10' making the stacked panels into a single sturdy panel.

Figure 6:
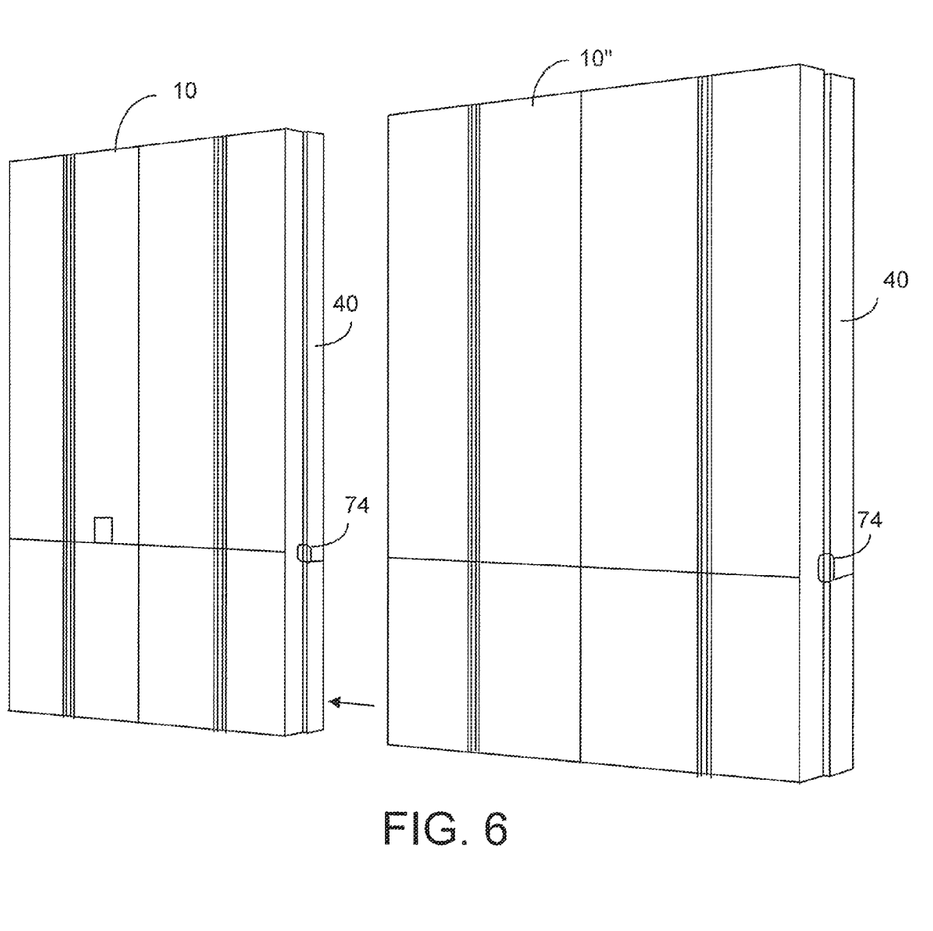
FIG. 6 shows two insulating panels positioned side-by-side.

In order to extend the width of the insulating panel 10 for covering a larger wall area, the insulating panel 10 also has a step 94 between the first thickness portion 12 and the second thickness portion 14 on the first edge 40, and a complementary step 95 on the second edge 42 as shown in FIG. 2. As such, two or more insulating panels can be joined together side-by-side as shown in FIG. 6. The step 94 on one panel and the complementary step 95 on an adjacent panel would make a shiplap joint (not shown). The shiplap joint between panel 10 and panel 10' as shown in FIG. 6 provides a guide for a sealant, such as urethane expanding foam sealant, to be applied and thus creates a watertight vertical joint between panels.

It should be understood that, when two insulating panels 10, 10' are stacked in the vertical direction as shown in FIG. 5, the vertical wire chase 72 in the insulating panel 10 and the vertical wire chase in the insulating panel 10' substantially form a single, continuous, vertical chase. Likewise, the drainage slots 56 on the insulating panel 10 are also aligned with the drainage slots on the insulating panel 10'. When two insulating panels 10, 10" are stacked in the horizontal direction as indicated in FIG. 6, the horizontal wire chase 74 in the insulating panel 10 and the horizontal wire chase 74 in the insulating panel 10" substantially form a single, continuous, horizontal chase.

In one embodiment of the present invention, the insulating panel 10 is made of one or more inorganic materials that do not support the growth of mold or fungi. The insulating panel can be a pre-formed foam panel. The dimensions of the insulating panel are calculated to maximize coverage while accommodating access into basements and hatchways. The dimensions are also selected to maintain standard framing dimension in stud layer patterns, for example. The inserted hat channels are made of a sturdy material, such as metal and other inorganic materials so that interior finish panels can be securely attached to the insulating panels. Optionally a laminate 150 can be provided on the panel surface that comes into contact with the basement walls, as shown in FIG. 5. The laminate 150 can act as a capillary break and a moisture barrier. The laminate 150 can be made of a water-resistant material, for example. As can be seen in FIG. 5, the metal stud 62 only penetrates only the front part of the panel core. It eliminates thermal bridging through the panel 10. Also, embedded metal studs in the foam core of the insulating panel can reduce sound transmission through the panel.

Figure 7:
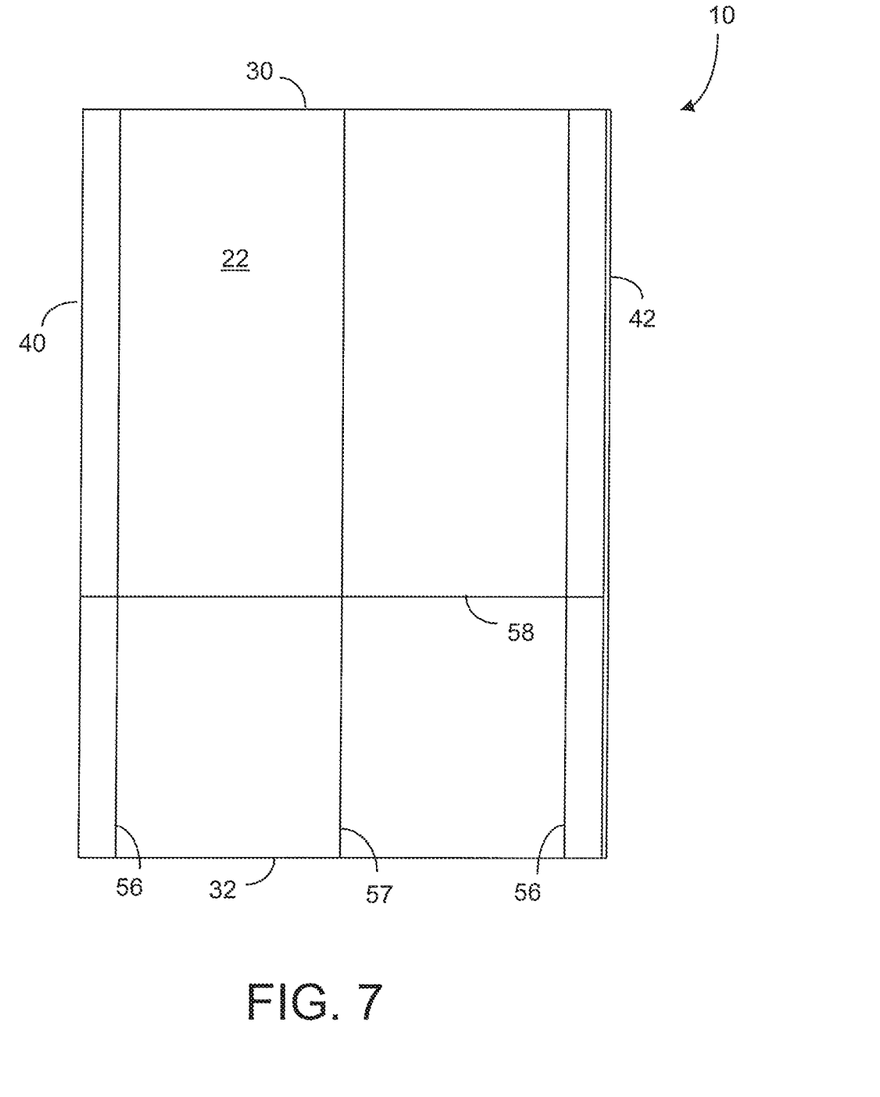
FIG. 7 shows the backside of the insulating panel.

FIG. 7 shows the backside of the insulating panel, according to various embodiments of the present invention. As shown in FIG. 6, drainage slots or channels are made into the second surface 22 of the insulating panel 10. Among those drainage slots, the drainage slots 56, 57 are made from the top side-surface 30 to the bottom side surface 32 and parallel to the edges 40, 42. The horizontal chase drainage slot 58 is made from the first edge 40 to the second edge 42, substantially to the horizontal wire chase 74 (see FIG. 1).

With various embodiments of the present invention, the present invention provides an inorganic insulating wall system for finishing walls, including basement walls. The system incorporates a capillary break, an integrated water drainage system and an electrical wire chase system within an insulating wall panel. Metal studs provided on metal hat channels can be used to attach the interior finish panel, such as wood paneling, onto the insulating panels. Embedded metal studs in the panel core could reduce the sound transmission in the panel and eliminate thermal bridging between the cold side and the warm side. Steps on the edges and the top/bottom surfaces of the insulating panel allow more panels to join together with shiplap joints.

It should be understood that each of the vertical slots 52 is dimensioned for insertion of a hat channel 62 as shown in FIGS. 2 and 5. However, the vertical slots made into the front surface 20 can have many different shapes to accommodate different studs. For example, each of the vertical slots 53, as shown in FIG. 8, is dimensioned for insertion of a C-shape stud 63.

Figure 9:
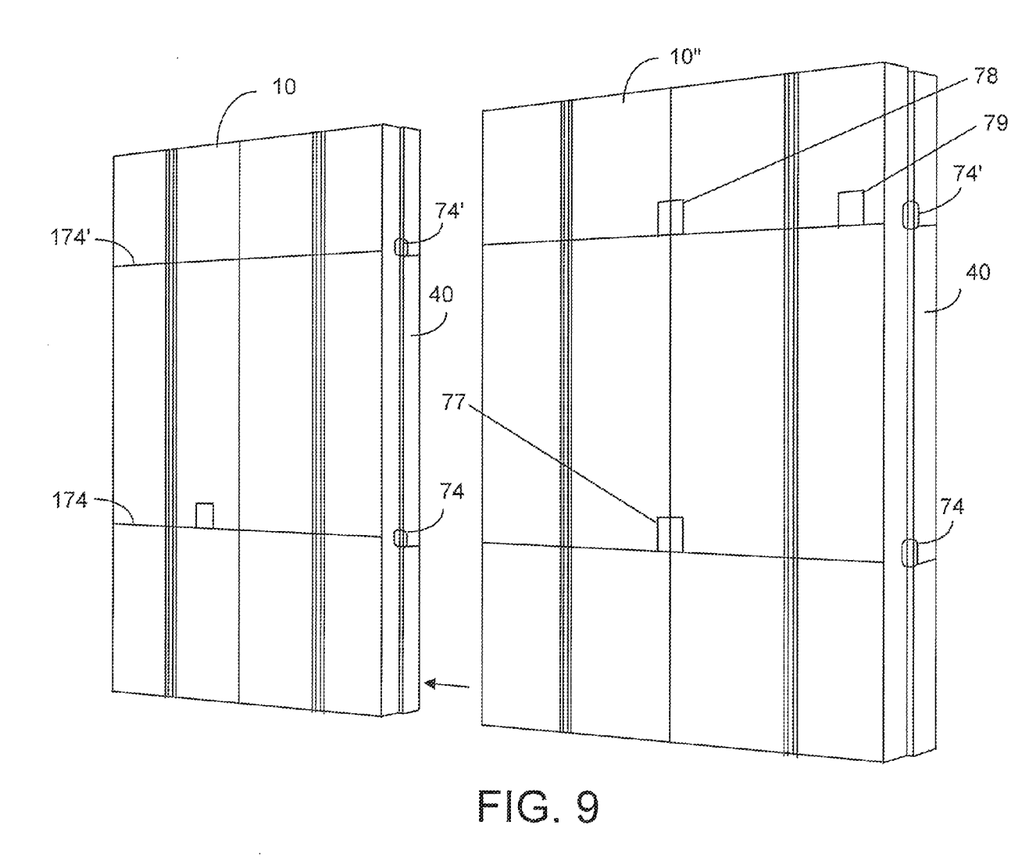
FIG. 9 shows a different embodiment of the present invention.

Furthermore, the insulating panel may have more cut pockets and horizontal wire chases. As shown in FIG. 9, an additional wire chase 74' is provided on the insulating panels 10, 10". The wire chase 74' is located approximately 42 inches from the lower edge of the insulating panels 10, 10". The wire chase 74' is dimensioned for insertion of electrical wires controllable by one or more switches, for example. As shown in FIG. 9, a field cut pocket 79 can be used to install an on/off switch box or a dimmer circuit box. Additional field cut pockets 77, 78 are also provided on one or more insulating panels for installation of additional junction boxes so that the electrical wires in the horizontal wire chase 74' can be spliced (through a vertical chase) into the perimeter circuit electrical wires in the horizontal chase 74. The electrical box installed in the cut pocket 79 can be a light-switch box, for example. Like the indicator 174 that marks the location of the horizontal wire chase 74, an indicator 174' can also be used to mark the location of the horizontal wire chase 74'. It is understood that the number and the locations of horizontal chases can be varied. For example, the horizontal chase 74 can be located approximately 16 inches off the floor and is used for the main perimeter circuit and floor level outlets. The horizontal chase 74' is approximately 42 inches off the floor to accommodate wall switches anywhere along the 42-inches horizontal line. An additional horizontal wire chase about 5 feet off the floor can be added to accommodate wall sconces, wall-mounted TV, etc. The vertical wire chases 72 (see FIG. 5) can be used as connection channels for splice points at intersections between the main perimeter circuit and other horizontal chase or chases higher up on the wall. The vertical wire chases can also be used to connect the electrical wires in one or more horizontal chases to the power cables in the basement ceiling, for example.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An insulating panel, comprising:
a first surface and an opposing second surface;
a first edge and an opposing second edge substantially parallel to a first direction;
a first side-surface and an opposing second side-surface substantially parallel to a second direction, the second direction substantially perpendicular to the first direction;
a panel core surrounded by the first side-surface, the first edge, the second side-surface and the second edge, the panel core having a panel thickness defined by the first surface and the second surface;
a first chase made through the panel core between the first surface and the second surface, from the first edge to the second edge, the first chase dimensioned for electrical wire insertion, the chase substantially parallel to the second direction;
one or more slots made into the first surface through part of the panel thickness, from the first side-surface to the second side-surface, each of said one or more slots substantially parallel to the first direction;
a second chase made through the panel core between the first surface and the second surface, from the first side-surface to the second side-surface, the second chase dimensioned for different electrical wire insertion, the second chase substantially parallel to the first direction;
a third chase made through the panel core between the first surface and the second surface, from the first edge to the second edge, the chase dimensioned for electrical wire insertion, the third chase substantially parallel to the second direction, the third chase spaced from the first chase;
a first pocket made through the first surface, the first pocket dimensioned for installation of an electrical box for electrically connecting one or more electrical wires in the first chase to one or more electrical-wires in the second chase; and
a second pocket made through the first surface, the second pocket dimensioned for installation of another electrical box for electrically connecting one or more electrical wires in the third chase to said one or more electrical wires in the second chase.

2. The insulating panel according to claim 1, wherein the panel thickness comprises a first thickness portion and a second thickness portion, and wherein the first chase is made through the panel core between the first thickness portion and the second thickness portion, and the second chase is made only through the second thickness portion.

3. The insulating panel according to claim 1, wherein each of said one or more slots is dimensioned for insertion of a hat channel, wherein each of said one or more slots has a slot length, and the hat channel has a hat channel length greater than the slot length such that the hat channel can be inserted into one of said one or more slots and a corresponding slot in another insulating panel.

4. An insulating panel, comprising:
a first surface and an opposing second surface;
a first edge and an opposing second edge substantially parallel to a first direction;
a first side-surface and an opposing second side-surface substantially parallel to a second direction, the second direction substantially perpendicular to the first direction;
a panel core surrounded by the first side-surface, the first edge, the second side-surface and the second edge, the panel core having a panel thickness defined by the first surface and the second surface;
a first chase made through the panel core between the first surface and the second surface, from the first edge to the second edge, the first chase dimensioned for electrical wire insertion, the chase substantially parallel to the second direction;
one or more slots made into the first surface through part of the panel thickness, from the first side-surface to the second side-surface, each of said one or more slots substantially parallel to the first direction;
a second chase made through the panel core between the first surface and the second surface, from the first side-surface to the second side-surface, the second chase dimensioned for different electrical wire insertion, the second chase substantially parallel to the first direction;
a first indicator having a first length made on the first surface substantially parallel to the first chase to indicate a location of the first chase; and
a second indicator having a second length made on the first surface substantially parallel to the second chase to indicate a location of the second chase, wherein the first chase has a first chase length substantially equal to the first length and the second chase has a second chase length substantially equal to the second length.

5. The insulating panel according to claim 4, further comprising:
a pocket made through the first surface, the pocket dimensioned for installation of an electrical box for providing an outlet for the electrical wire inserted in the first chase.

6. The insulating panel according to claim 4, further comprising:
a first step made along the first edge between the first thickness portion and the second thickness portion; and
a complementary second step made along the second edge between the first thickness portion and the second thickness portion.

7. The insulating panel according to claim 4, further comprising:
at least one channel made into the second surface through part of the panel thickness, from the first side-surface to the second side-surface, said at least one channel substantially parallel to the first direction and spaced from the second chase.

8. The insulating panel according to claim 4, wherein the panel core is made of one or more inorganic materials, said insulating panel further comprising:
a water-resistant laminate provided on the second surface.

9. An insulating panel, comprising:
a first surface and an opposing second surface;
a first edge and an opposing second edge substantially parallel to a first direction;
a first side-surface and an opposing second side-surface substantially parallel to a second direction, the second direction substantially perpendicular to the first direction;
a panel core surrounded by the first side-surface, the first edge, the second side-surface and the second edge, the panel core having a panel thickness defined by the first surface and the second surface;

a first chase made through the panel core between the first surface and the second surface, from the first edge to the second edge, the first chase dimensioned for electrical wire insertion, the chase substantially parallel to the second direction;

one or more slots made into the first surface through part of the panel thickness, from the first side-surface to the second side-surface, each of said one or more slots substantially parallel to the first direction;

a second chase made through the panel core between the first surface and the second surface, from the first side-surface to the second side-surface, the second chase dimensioned for different electrical wire insertion, the second chase substantially parallel to the first direction; and a first channel made into the second surface through part of the panel thickness, from the second surface to the first chase, the first channel substantially parallel to the first chase, wherein the first chase has a first chase width parallel to the first surface and the first channel is smaller than the first chase width, and when the insulating panel is positioned such that the first direction is substantially parallel to a vertical direction and the second direction is substantially parallel to a horizontal direction, the first channel is located at a bottom part of the first chase.

10. The insulating panel according to claim 4, further comprising a second channel made into the second surface through part of the panel thickness, from the second surface to the second chase, the second channel substantially parallel to the second chase, wherein the second chase has a second chase width parallel to the first surface and the second chase is smaller than the second chase width.

11. The insulating panel according to claim 10, wherein the second channel is arranged to intersect with the first channel so as to provide drainage for water in the first chase through the second chase.

12. An insulating panel, comprising:
a first surface and an opposing second surface;
a first edge and an opposing second edge substantially parallel to a first direction;
a first side-surface and an opposing second side-surface substantially parallel to a second direction, the second direction substantially perpendicular to the first direction;
a panel core surrounded by the first side-surface, the first edge, the second side-surface and the second edge, the panel core having a panel thickness defined by the first surface and the second surface;
a first chase made through the panel core between the first surface and the second surface, from the first edge to the second edge, the first chase dimensioned for electrical wire insertion, the chase substantially parallel to the second direction;
a second chase made through the panel core between the first surface and the second surface, from the first side-surface to the second side-surface, the second chase dimensioned for different electrical wire insertion, the second chase substantially parallel to the first direction;
at least one channel made into the second surface through part of the panel thickness, from the first side-surface to the second side-surface, said at least one channel substantially parallel to the first direction, said at least one channel spaced from the second chase; and
a pocket made through the first surface, the pocket dimensioned for installation of an electrical box for providing an outlet for the electrical wire inserted in the first chase, wherein the pocket is arranged such that the electrical box can be used for connection between one or more electrical wires in the first chase and one or more electrical wires in the second chase.

13. The insulating panel according to claim 12, wherein the panel thickness comprises a first thickness portion and a second thickness portion, the insulating panel further comprising:
a first step made along the first edge between the first thickness portion and the second thickness portion; and
a complementary step made along the second edge between the first thickness portion and the second thickness portion for forming a shiplap joint.

14. A wall insulation system, comprising:
one or more hat channels;
a first insulating panel; and
a second insulating panel, each of the first insulating panel and the second insulating panel comprising:
a first surface and an opposing second surface;
a first edge and an opposing second edge substantially parallel to a first direction;
a first side-surface and an opposing second side-surface substantially parallel to a second direction, the second direction substantially perpendicular to the first direction;
a panel core surrounded by the first side-surface, the first edge, the second side-surface and the second edge, the panel core having a panel thickness defined by the first surface and the second surface;
a first chase made through the panel core between the first surface and the second surface, from the first edge to the second edge, the chase dimensioned for electrical wire insertion, the chase substantially parallel to the second direction, wherein the first insulating panel and the second insulating panel are configured to form a shiplap joint for joining with each other, and
one or more slots made into the first surface through part of the panel thickness, from the first side-surface to the second side-surface, each of said one or more slots substantially parallel to the first direction, wherein each of said one or more slots is dimensioned for insertion of a hat channel, and each of said one or more slots has a slot length and the hat channel has a hat channel length greater than the slot length such that the hat channel can be inserted into one of said one or more slots in the first insulating panel and a corresponding slot in the second insulating panel.

15. The wall insulation system according to claim 14, wherein each of the first insulating panel and the second insulating panel further comprises:
a second chase made through the panel core between the first surface and the second surface, from the first side-surface to the second side-surface, the second chase dimensioned for different electrical wire insertion, the second chase substantially parallel to the first direction.

16. The wall insulation system according to claim 14, wherein the panel thickness comprises a first thickness portion and a second thickness portion, and wherein each of the first insulating panel and the second insulating panel further comprises:
a first step made along the first edge between the first thickness portion and the second thickness portion; and
a complementary step made along the second edge between the first thickness portion and the second thickness portion for forming the shiplap joint.

17. The wall insulation system according to claim 14, wherein the panel thickness comprises a first thickness portion and a second thickness portion, and wherein the first insulating panel further comprises a first step made along the second side-surface between the first thickness portion and the second thickness portion, and
the second insulating panel further comprises a second step along the first side-surface between the first thickness portion and the second thickness portion, the second step complementary to the first step for forming the shiplap joint.

* * * * *

UNITED STATES PATENT AND TRADEMARK OFFICE
CERTIFICATE OF CORRECTION

PATENT NO. : 8,978,325 B2
APPLICATION NO. : 13/307596
DATED : March 17, 2015
INVENTOR(S) : David L. Lewis Page 1 of 1

It is certified that error appears in the above-identified patent and that said Letters Patent is hereby corrected as shown below:

In the Claims

In column 9, line 26 (claim 10, line 1) "claim 4" should be --claim 9--.

Signed and Sealed this
Twenty-ninth Day of September, 2015

Michelle K. Lee
*Director of the United States Patent and Trademark Office*